(12) United States Patent
Lai et al.

(10) Patent No.: US 7,538,716 B2
(45) Date of Patent: May 26, 2009

(54) SYSTEM AND METHOD FOR LOCATION DETERMINATION USING TIME DIFFERENCES

(75) Inventors: Yu-Sheng Lai, Hsinchu (TW); Wen-Yang Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 210 days.

(21) Appl. No.: 11/499,782

(22) Filed: Aug. 7, 2006

(65) Prior Publication Data
US 2007/0139257 A1 Jun. 21, 2007

(30) Foreign Application Priority Data
Dec. 16, 2005 (TW) ............................... 94144938 A

(51) Int. Cl.
*G01S 13/74* (2006.01)
*G01S 13/08* (2006.01)
(52) U.S. Cl. .................. 342/118; 342/42; 342/126; 342/146
(58) Field of Classification Search ............ 342/42–45, 342/125, 126, 146, 158, 95–97, 127
See application file for complete search history.

(56) References Cited

U.S. PATENT DOCUMENTS

| 3,187,327 | A | * | 6/1965 | Schneider et al. ............ 342/88 |
| 4,060,805 | A | * | 11/1977 | McComas .................... 342/38 |
| 4,104,629 | A | * | 8/1978 | Isbister et al. ................. 342/43 |
| 4,107,675 | A | * | 8/1978 | Sellers et al. ................. 342/42 |
| 5,239,310 | A | * | 8/1993 | Meyers et al. ............... 342/453 |
| 5,327,145 | A | * | 7/1994 | Jelinek ........................ 342/453 |
| 5,420,903 | A | * | 5/1995 | Newton .......................... 377/5 |
| 5,493,283 | A |   | 2/1996 | Hopper et al. |
| 5,525,967 | A | * | 6/1996 | Azizi et al. ............... 340/572.1 |
| 5,646,632 | A |   | 7/1997 | Khan et al. |
| 5,659,617 | A | * | 8/1997 | Fischer ....................... 380/258 |
| 5,771,002 | A | * | 6/1998 | Creek et al. ............ 340/539.21 |
| 5,924,040 | A | * | 7/1999 | Trompower .............. 455/456.2 |
| 6,031,460 | A | * | 2/2000 | Banks ..................... 340/573.1 |
| 6,072,421 | A | * | 6/2000 | Fukae et al. .................. 342/42 |
| 6,114,957 | A | * | 9/2000 | Westrick et al. .......... 340/568.1 |

(Continued)

FOREIGN PATENT DOCUMENTS
TW I223534 11/2004
TW I225375 12/2004

*Primary Examiner*—Thomas H Tarcza
*Assistant Examiner*—Peter M Bythrow
(74) *Attorney, Agent, or Firm*—Volentine & Whitt, PLLC

(57) ABSTRACT

The present invention relates to a system and a method for location determination using time differences. The method of the invention comprises the steps of: transmitting a transmission signal by using a directional transmitter rotating at an angular velocity, the transmission signal comprising a transmission identification and the transmitting time; receiving the transmission signal by using an omnidirectional transceiver, and adding a personal identification to the transmission signal to be a response signal; transmitting the response signal; receiving the response signal by using an omnidirectional receiver and recording the receiving time; and calculating the location of the omnidirectional transceiver corresponding to the directional transmitter according to the difference between the receiving time and the transmitting time. By utilizing the system and the method of the invention, the corresponding location of the omnidirectional transceiver can be calculated accurately without disposing a lot of sensors in the space, and the system of the invention need not be reconfigured for new environments. Therefore, the conventional problems of high installation cost and complicated settings can be improved.

13 Claims, 4 Drawing Sheets

U.S. PATENT DOCUMENTS

| | | | |
|---|---|---|---|
| 6,275,705 B1 * | 8/2001 | Drane et al. | 455/456.2 |
| 6,348,856 B1 * | 2/2002 | Jones et al. | 340/10.1 |
| 6,400,754 B2 * | 6/2002 | Fleming et al. | 375/140 |
| 6,420,996 B1 * | 7/2002 | Stopczynski et al. | 342/70 |
| 6,483,427 B1 * | 11/2002 | Werb | 340/10.1 |
| 6,788,199 B2 * | 9/2004 | Crabtree et al. | 340/539.13 |
| 6,839,027 B2 | 1/2005 | Krumm et al. | |
| 6,865,347 B2 | 3/2005 | Perkins et al. | |
| 7,148,801 B2 * | 12/2006 | Crabtree et al. | 340/539.13 |
| 7,239,264 B2 * | 7/2007 | Cherniakov | 342/51 |
| 7,248,933 B2 * | 7/2007 | Wildman | 700/90 |
| 7,315,275 B2 * | 1/2008 | Stephens | 342/146 |
| 2003/0214411 A1 * | 11/2003 | Walter et al. | 340/573.4 |
| 2007/0085725 A1 * | 4/2007 | Hayles et al. | 342/45 |

* cited by examiner

SYSTEM AND METHOD FOR LOCATION DETERMINATION USING TIME DIFFERENCES

BACKGROUND OF THE INVENTION

1. Field of the Invention

The invention relates to a system and method for location determination, particularly to a system and method for location determination using time differences.

2. Description of the Related Art

The conventional system for location determination can be classified into three types: proximity, triangulation, and scene analysis. With regard to the proximity type, referring to U.S. Pat. No. 5,493,283, the precision of location determination is corresponding to the transmission range of bases and sensors. The higher the precision is, the smaller the transmission range must be. Therefore, more bases or sensors are needed, and the installation cost is higher.

Referring to U.S. Pat. Nos. 5,646,632 and 6,275,705, the triangulation type is the most popular one. The triangulation type mainly uses the distances or the angles between bases and sensors to determine the location. If using the distances for determination, three distances between three reference points and the user are needed to determine the location of the user on a plane. The distances can be obtained according to propagation time of signals or according to the decay of signal intensities. If using the angles for determination, it is necessary to know two angles formed by the user and two reference points so as to determine the location. The angles may be obtained by using some specially designed hardware.

Scene analysis uses the information of scenes or objects, for example, the signal intensity of the location compared with that in the database, to determine the location. Referring to U.S. Pat. No. 6,839,027, it is necessary to build a database for every environment so that the setup is more complicated. In the method of using multiple signal intensities of bases in the environment, signal intensities of each location in the environment must be measured beforehand in order to build the database of signal intensities. And then the probable location can be determined by utilizing the present measured signal intensities.

Referring to U.S. Pat. No. 6,865,347, it discloses a photography method by utilizing devices or some specially designed hardware to measure the direction of incident light, the angle of elevation, and the distance. However, the method is easily influenced by sunlight and other light sources so as to decrease the practicability of the method.

Referring to FIG. 4, it shows a conventional radar location determination system. The radar location determination system 40 comprises a radar 41 and a detected object 42. The radar location determination system 40 uses the time of reflection of microwave to calculate the distance, and also determines whether the detected object 42 is a friendly plane or an enemy plane according to the ability for responding some predefined codes. However, the radar location determination system 40 uses single directional radar 41 to transmit and receive signals, and the single directional radar 41 is also used to determine the direction and the elevation angle of the signal. Therefore, the radar location determination system 40 cannot rotate the single directional radar 41 by a large angle within the period before the reflecting microwave from the detected object 42 reaches the radar location determination system 40, in order to receive the responding signals and to determine the location precisely. Thus, after the radar 41 transmits a detecting signal, the radar location determination system 40 has to be static or rotate slowly within the period for waiting for receiving the reflecting signal from the detected object 42 so as to calculate the distance of the detected object 42. Therefore, the radar location determination system 40 has longer detecting time.

Consequently, there is an existing need for a system for location determination to solve the above-mentioned problem.

SUMMARY OF THE INVENTION

The present invention provides a system for location determination using time differences. The system of the invention comprises a directional transmitter, an omnidirectional transceiver and an omnidirectional receiver. The directional transmitter rotates at an angular velocity and is used to transmit a transmission signal. The transmission signal comprises a transmission identification and a transmitting time. The omnidirectional transceiver is used to receive the transmission signal, add a personal identification to the transmission signal to be a response signal, and transmit the response signal. The omnidirectional receiver is used to receive the response signal from the omnidirectional transceiver and record a receiving time. The directional transmitter and the omnidirectional receiver are disposed in a wireless transceiver device. The wireless transceiver device is used to calculate a location of the omnidirectional transceiver corresponding to the directional transmitter according to the difference between the receiving time and the transmitting time.

The present invention provides a method for location determination using time differences. The method of the invention comprises the steps of: transmitting a transmission signal by using a directional transmitter rotating at an angular velocity, the transmission signal comprising a transmission identification and a transmitting time; receiving the transmission signal by using an omnidirectional transceiver, and adding a personal identification to the transmission signal to be a response signal; transmitting the response signal; receiving the response signal by using an omnidirectional receiver and recording a receiving time; and calculating the location of the omnidirectional transceiver corresponding to the directional transmitter according to the difference between the receiving time and the transmitting time.

By utilizing the system and the method of the invention, the wireless transceiver device can determine the corresponding location of the omnidirectional transceiver (disposed in a electrical badge) without disposing a lot of sensors in the space, and the system of the invention need not be reconfigured for new environments, whereby the conventional problems of high installation cost and complicated settings can be improved. Furthermore, the corresponding location of the electrical badge can be calculated accurately with little error.

DETAILED DESCRIPTION OF THE INVENTION

Figure 1:
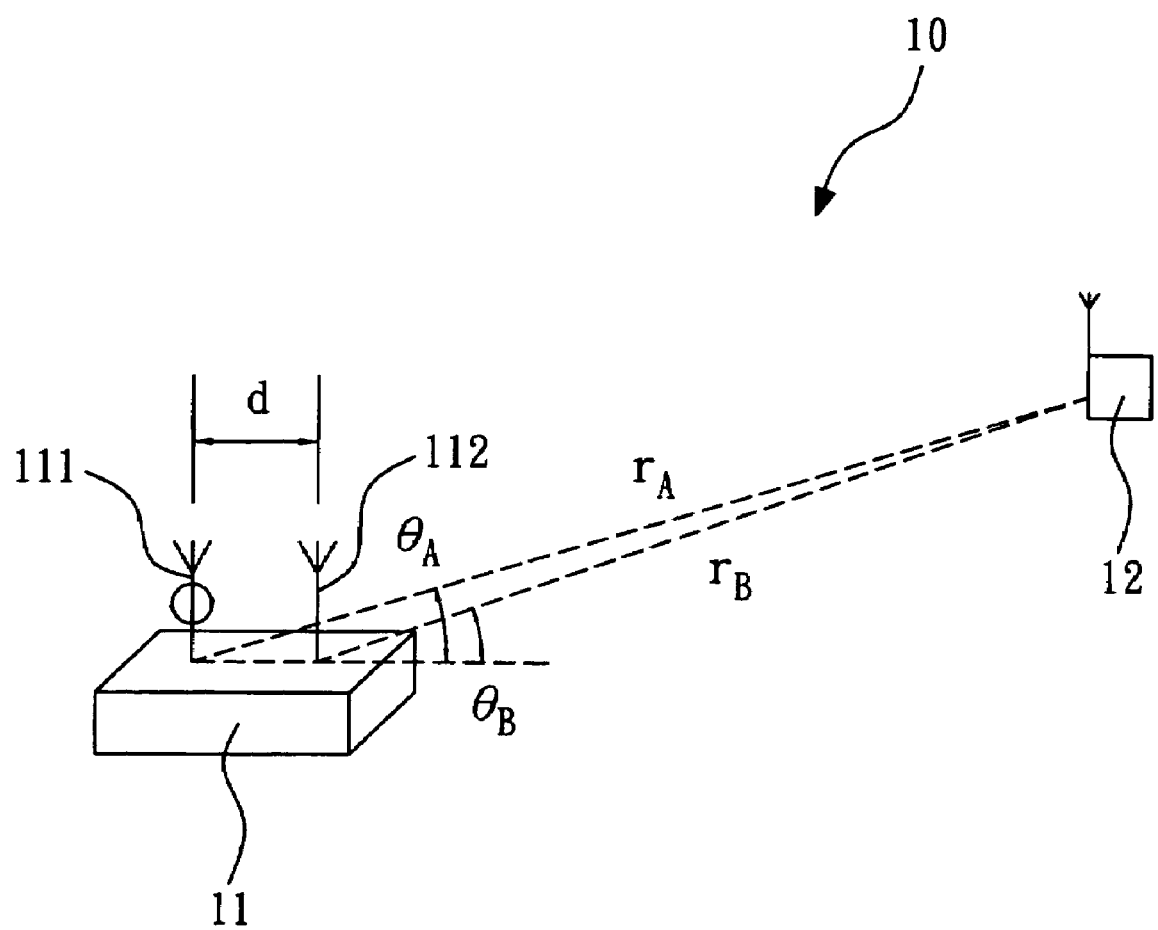
FIG. 1 shows a system for location determination using time differences according to the present invention.
Figure 2:
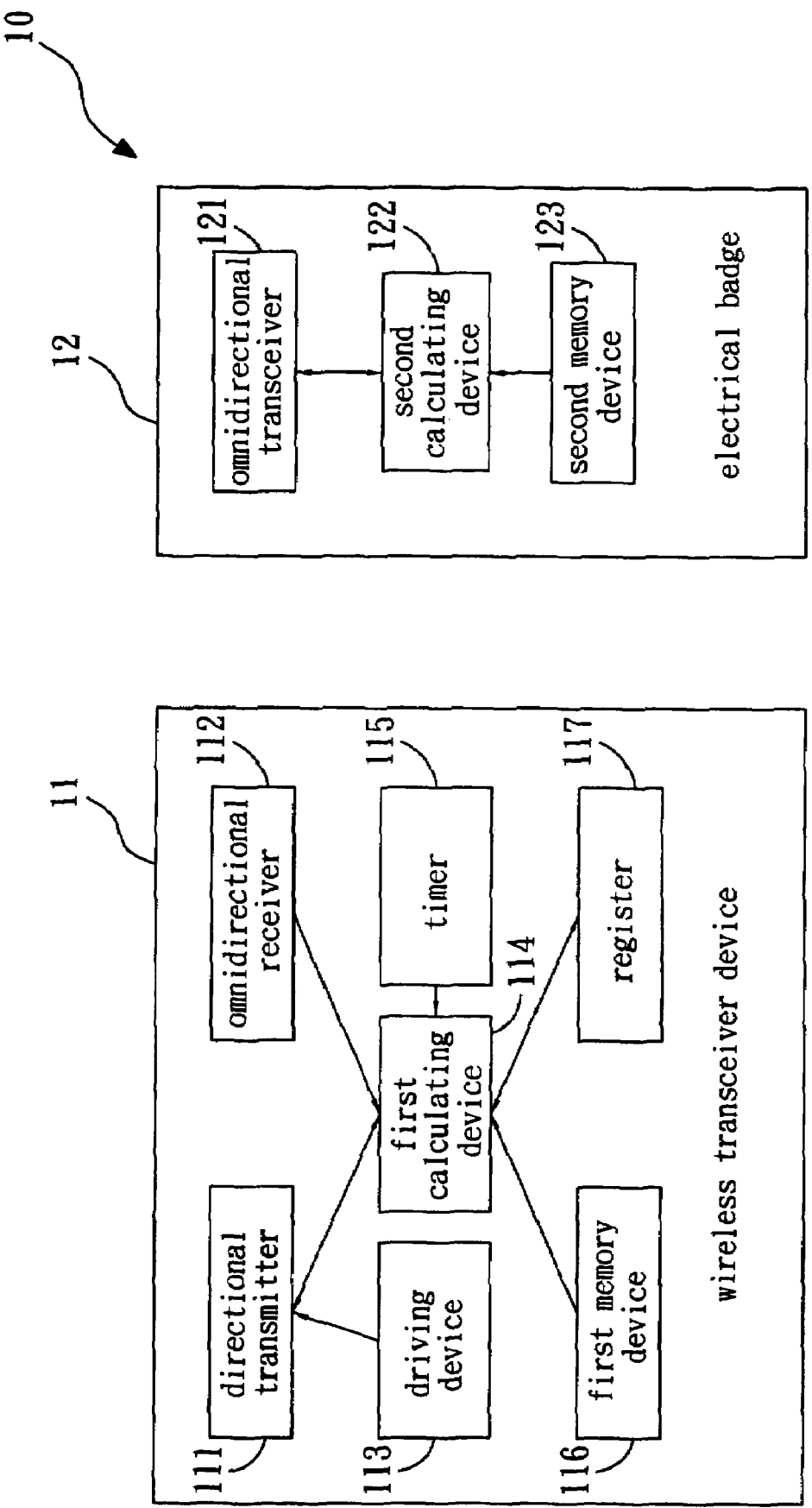
FIG. 2 shows a block diagram of a system for location determination using time differences according to the present invention.

Referring to FIG. 1 and FIG. 2, they show a system for location determination using time differences according to the present invention. The system 10 comprises a wireless transceiver device 11 and an electrical badge 12. The wireless transceiver device 11 comprises a directional transmitter 111, an omnidirectional receiver 112, a driving device 113, a first calculating device 114, a timer 115, a first memory device 116 and a register 117. The electrical badge 12 comprises an omnidirectional transceiver 121, a second calculating device 122 and a second memory device 123.

The directional transmitter 111 is away from the omnidirectional receiver 112 by a predetermined distance d. The directional transmitter 111 is used to transmit a transmission signal, and the transmission signal comprises a transmission identification. The directional transmitter 111 is away from the electrical badge 12 by a distance $r_A$. The stretching line of the directional transmitter 111 to the electrical badge 12 and the stretching line of the directional transmitter 111 to the omnidirectional receiver 112 form an angle $\theta_A$. The omnidirectional receiver 112 is away from the electrical badge 12 by a distance $r_B$. The stretching line of the omnidirectional receiver 112 to the electrical badge 12 and the stretching line of the directional transmitter 111 to the omnidirectional receiver 112 form an angle $\theta_B$. The stretching line of the directional transmitter 111 to the omnidirectional receiver 112 is defined as zero degree.

The omnidirectional transceiver 121 is used to receive the corresponding transmission signal, adds a personal identification to the transmission signal to be a response signal and transmits the response signal. The omnidirectional receiver 112 is used to receive the response signal from the omnidirectional transceiver 121. The directional transmitter 111 and the omnidirectional receiver 112 are disposed in the wireless transceiver device 11.

The driving device 113 is used to drive the directional transmitter 111 to rotate at an angular velocity $\omega$. The first calculating device 114 is used to produce the transmission signal for the directional transmitter 111 and determine whether the transmission identification of the response signal is equal to the transmission identification of the transmission signal. If the transmission identification of the response signal is equal to the transmission identification of the transmission signal, a receiving time is recorded.

The register 117 is used to save a referring time when the directional transmitter 111 passes by a referring direction. Then the register 117 transmits the referring time to the first calculating device 114. The first memory device 116 is used to save the transmission identification and transmit the transmission identification to the first calculating device 114.

The second calculating device 122 is used to add the personal identification to the transmission signal. The second memory device 123 is used to save the personal identification and transmits the personal identification to the second calculating device 122.

Figure 3:
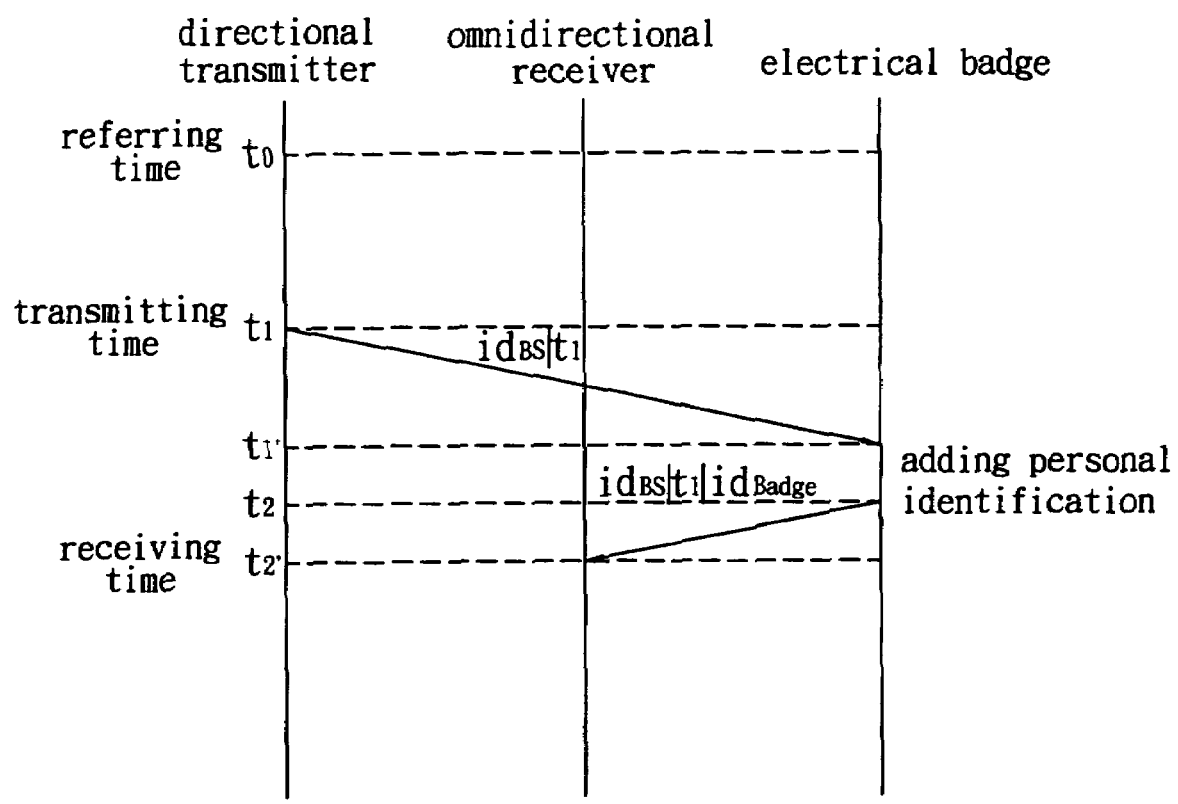
FIG. 3 shows a flow chart of a method for location determination using time differences according to the present invention.
Figure 4:
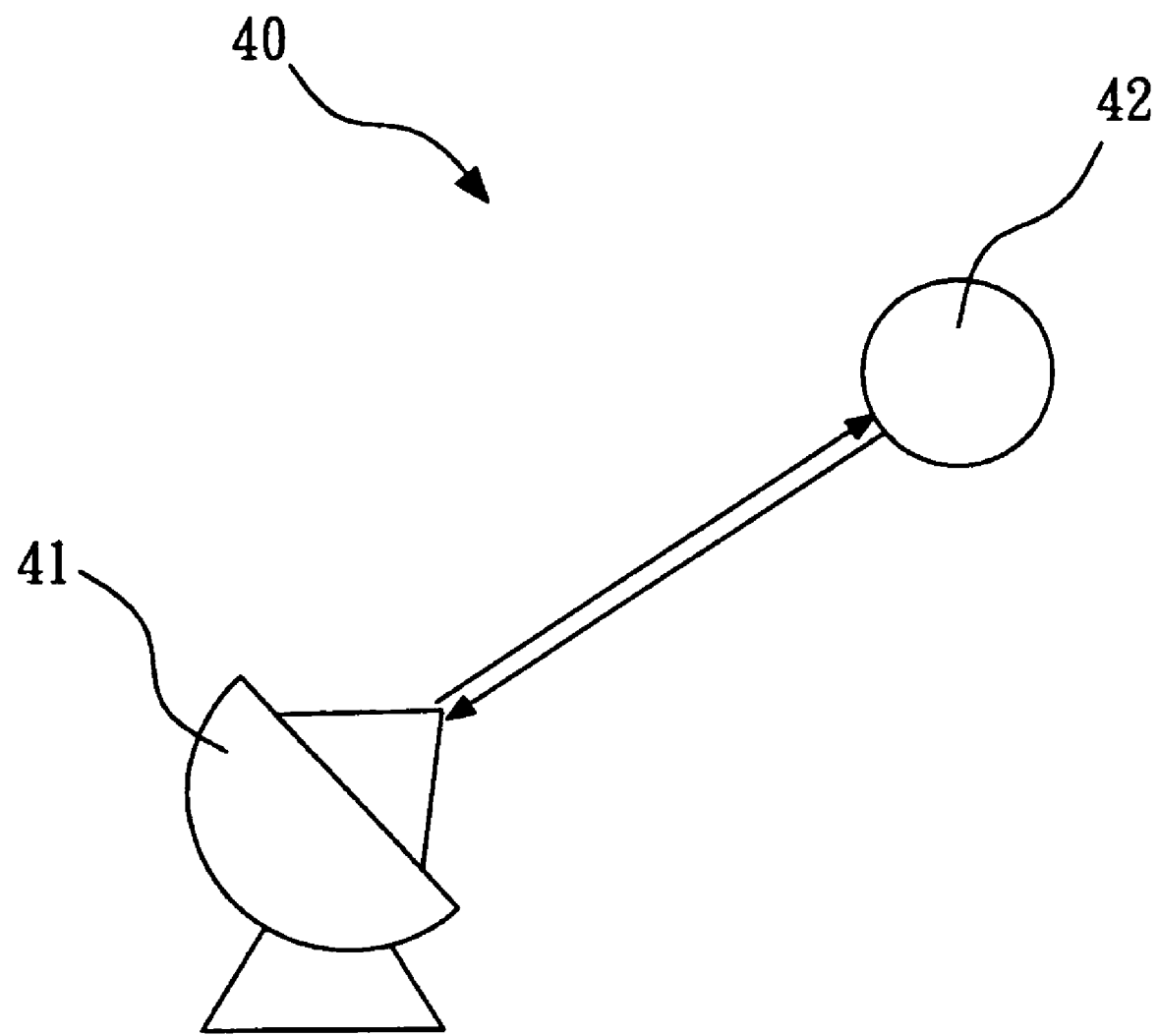
FIG. 4 shows a conventional radar location determination system.

Referring to FIG. 3, it shows a flow chart of a method for location determination using time differences according to the present invention. A referring time $t_0$ is recorded when the directional transmitter 111 passes by a referring direction (the stretching line of the directional transmitter 111 to the omnidirectional receiver 112 is defined as the referring direction, shown in FIG. 1).

When the directional transmitter 111 passes by the referring direction, the wireless transceiver device 11 records the referring time to and stores it in the register 117. The directional transmitter 111 rotates at the angular velocity co and transmits different transmission signals at different angles, and the transmission signals comprise a transmitting time $t_1$ and a transmission identification $id_{BS}$. A time when the omnidirectional transceiver 121 of the electrical badge 12 receives the transmission signal is denoted as $t_1'$. The second calculating device 122 of the electrical badge 12 adds a personal identification to the transmission signal to be a response signal $id_{BS}|t_1|id_{Badge}$. A time when the omnidirectional transceiver 121 transmits the response signal is denoted as $t_2$. A time when the omnidirectional receiver 112 receives the response signal is denoted as $t_2'$.

Since there may be a plurality of directional transmitters to transmit different transmission signals, the individual transmission identification of each transmission signal must be further identified. When the omnidirectional receiver 112 receives the response signal, the wireless transceiver device 11 must examine whether the transmission identifications $id_{BS}$ of the response signal $id_{BS}|t_1|id_{Badge}$ is equal to the transmission identifications $id_{BS}$ of the transmission signal. If the personal identifications $id_{BS}$ of the response signal $id_{BS}|t_1|id_{Badge}$ is equal to the transmission identifications of the transmission signal, then the receiving time $t_2'$ is recorded. According to the difference between the receiving time $t_2'$ and the transmitting time $t_1$, the distance $r_A$ from the electrical badge 12 to the directional transmitter 111 can be calculated. The angle $\theta_A$ is calculated according to the angular velocity $\omega$, the transmitting time $t_1$ and the referring time $t_0$. The distance $r_A$ and the angle $\theta_A$ are calculated by following equations:

$$r_A = (t_1' - t_1) \times v \cong \frac{t_2' - t_1 - c}{2} \times v, \, d \ll r_A, r_B \quad (1)$$

$$\theta_A = (t_1 - t_0) \times \omega \quad (2)$$

Wherein v is the transmitting velocity of transmission signal; $\omega$ is the angular velocity of the directional transmitter 111; c is the proceeding time $(t_2-t_1')$ of the electrical badge 12; and d is the distance from the directional transmitter 111 to the omnidirectional receiver 112. In addtion, $r_A$ and $r_B$ are much larger than d, thus $r_A$ is almost equal to $r_B$ so that two times $r_A$ is substituted in above equation (1) and the round-trip time is $(t_2'-t_1-c)$.

Theoretically, the location can be precisely determined and has little error by using the system and method for location determination according to the present invention, if the necessary physical characteristics are accurately measured. However, the timer 115 of the system 10 and some measuring errors may cause a certain range of errors. If the v, $\omega$ and c can be accurately measured, the error is proximately in proportion to the minimum unit of time; otherwise, the influence caused by the measuring errors from v, $\omega$ and c must be calculated. In addition, the influence caused by $r_A$ and $r_B$ can be 0.5 d in maximum when the badge 12, the directional transmitter 111 and the omnidirectional receiver 112 are in a line. The calculating equations are as follows:

$$\Delta r_A \cong \frac{\Delta t}{2} \times v + \frac{c}{2} \times v$$

$$\Delta \theta_A = \Delta t \times \omega$$

In the method for three-dimensional location determination, a plurality of directional transmitters can be respectively disposed at every elevation angle to form a directional transmitter group. The directional transmitter group has a rotating shift. Each directional transmitter in different elevation angles must have a different transmission identification to be distinguished.

In the embodiment of the present invention, the ultrasonic wave is used to be the medium for transmitting signals. The speed of the ultrasonic wave is influenced by the density of air, for example, the transmitting velocity of the supersonic wave is about (331+0.6T) m/s with dry air and in room temperature, wherein T is the temperature (° C.). The ultrasonic wave with frequency of 40 kHz is usually used because it has a wave length shorter than 1 cm so that diffraction does not happen, energy does not decay easily, and it is well directional with a −15 db decay of intensity between ±15° referring to the forward direction. Therefore, the ultrasonic wave is a suitable medium for the directional transmitter 111. In the embodiment, the receiver that receives the ultrasonic wave is a microphone that receives sound waves omnidirectionally. The omnidirectional transceiver 121 of the electrical badge 12 can comprise a plurality of ultrasonic transmitters and a receiver. The ultrasonic wave can generally be transmitted by a distance about 6 m to 10 m according to the different environments.

Using the ultrasonic wave for transmitting signal, that there is ultrasonic wave transmitted in an unit time represents bit 1 and that there is no ultrasonic wave transmitted in an unit time represents bit 0 respectively. At the beginning of transmission, the predetermined format, for example 10101010, can be used to be a start of a signal. The successful probability of communication can be improved by using the Hamming Code. The amount of the transmitting bits is relative to frequency, intensity and angular velocity of the ultrasonic wave. When the frequency of the ultrasonic wave is 40 kHz, the covering angle of the directional transmitter 111 forward is 30 degrees and the angular velocity ω of the directional transmitter 111 is 1 RPS, there are about 3.3 kbits of data that can be transmitted.

Referring to FIG. 1 and FIG. 2, the transmission identification $id_{BS}$ of the wireless transceiver device 11 is 781; the angular velocity ω is 1 RPS; the distance d from the directional transmitter 111 to the omnidirectional receiver 112 is 10 cm; the minimum unit of time is 1 μs; the proceeding time of the electrical badge 12 is 10 μs; and the transmitting velocity v of transmission signal is about 346 m/s at 25° C.

When the directional transmitter 111 of the wireless transceiver device 11 passes by the referring angle, the register 117 of the wireless transceiver device 11 records the time $t_0$ as 1,000,000 μs. The directional transmitter 111 continuously transmits the transmission signal, and the transmission signal comprises the transmission identification $id_{BS}$ 781 of the wireless transceiver device 11 and the transmitting time $t_1$ of the transmission signal. After receiving the transmission signal comprising the transmission identification $id_{BS}$ 781 and the transmitting time $t_1$ (1,468,975 μs) of the transmission signal, the electrical badge 12 adds the personal identification 1649 to the transmission signal and then transmits the response signal to the wireless transceiver device 11. The receiving time $t_2$ that the wireless transceiver device 11 receives the response signal is 1,495,867 μs. As the result, $r_A$ and $r_B$ can be calculated using above-mentioned equations (1) and (2):

$$r_A \cong \frac{t_2 - t_1 - c}{2} \times v$$
$$= \frac{(1495867\,\mu s - 1468975\,\mu s - 10\,\mu s) \times 10^{-6}}{2} \times 346\frac{m}{s}$$
$$= 4.650\,m$$

-continued $$\theta_A = (t_1 - t_0) \times \omega$$
$$= (1468975\,\mu s - 1000000\,\mu s) \times 10^{-6} \times \frac{360°}{1s}$$
$$= 168.831°$$

After calculating, the location of the electrical badge 12 corresponding to the wireless transceiver device 11 is (4.6506 m, 168.831°). The errors can be influenced by unit of time, the proceeding time c of the electrical badge 12 and the distance d from the directional transmitter 111 to the omnidirectional receiver 112, wherein measurement errors of the v and ω are set to be 1%. The influence of unit of time comprises the distance that the ultrasonic wave transmits in a time unit and the rotating angle in time unit, and those are 0.346 mm and 0.00036° respectively. The proceeding time c can cause the same error for every measurement error against one time unit. However, the error can be mainly influenced by d, where maximum error can reach 5 cm. The influence of v and ω directly are shown in the result, and the errors of 1% are 4.6506 cm and 1.68831°. In the embodiment, all of the above-mentioned errors totally are about 10 cm and 1.8°. Therefore, there can be little error in using the system for location determination according to the present invention.

By utilizing the system and the method of the invention, the wireless transceiver device can accurately determine the corresponding location of the electrical badge without disposing a lot of sensors in the space, and the system of the invention need not be set for new environments, whereby the conventional problems of high installation cost and complicated settings can be improved. Furthermore, the corresponding location of the electrical badge can be accurately calculated with little error.

While the embodiments have been illustrated and described, various modifications and improvements can be made by those who skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

What is claimed is:

1. A system for location determination using time differences, comprising:
   a directional transmitter, rotating at an angular velocity, for transmitting a transmission signal, the transmission signal comprising a transmission identification and a transmitting time;
   an omnidirectional transceiver, for receiving the transmission signal, adding a personal identification to the transmission signal to be a response signal, and transmitting the response signal; and
   an omnidirectional receiver, for receiving the response signal from the omnidirectional transceiver and recording a receiving time, the directional transmitter and the omnidirectional receiver disposed in a wireless transceiver device for calculating the location of the omnidirectional transceiver corresponding to the directional transmitter according to the difference between the receiving time and the transmitting time.

2. The system for location determination according to claim 1, wherein the wireless transceiver device further comprises a driving device for driving the directional transmitter to rotate at the angular velocity.

3. The system for location determination according to claim 1, wherein the wireless transceiver device further comprises a first calculating device for producing the transmission signal for the directional transmitter and determining whether the transmission identification in the response signal is equal to the transmission identification of the wireless transceiver device, if the transmission identifications are equal, the receiving time is recorded, and then the location of the omnidirectional transceiver corresponding to the directional transmitter is calculated according to the difference between the receiving time and the transmitting time.

4. The system for location determination according to claim 3, wherein the location of the omnidirectional transceiver comprises an angle and a distance, the angle is calculated according to the angular velocity, the transmitting time and a referring time; the distance is calculated according to the difference between the receiving time and the transmitting time.

5. The system for location determination according to claim 4, wherein the wireless transceiver device further comprises a register for saving a referring time when the directional transmitter passes by a referring direction, and transmitting the referring time to the first calculating device.

6. The system for location determination according to claim 3, wherein the wireless transceiver device further comprises a first memory device for saving the transmission identification, and transmitting the transmission identification to the first calculating device.

7. The system for location determination according to claim 3, wherein the wireless transceiver device further comprises a timer for transmitting the transmitting time to the first calculating device.

8. The system for location determination according to claim 1, wherein the omnidirectional transceiver is disposed in an electrical badge comprising a second calculating device for adding the personal identification to the transmission signal.

9. The system for location determination according to claim 8, wherein the electrical badge further comprises a second memory device for saving the personal identification, and transmitting the personal identification to the second calculating device.

10. A method for location determination using time differences, comprising the steps of:
    continuously transmitting a transmission signal by using a directional transmitter rotating at an angular velocity, the transmission signal comprising a transmission identification and a transmitting time;
    receiving the transmission signal by using an omnidirectional transceiver, adding a personal identification to the transmission signal to be a response signal, and transmitting the response signal;
    receiving the response signal by using an omnidirectional receiver and recording a receiving time; and
    calculating the location of the omnidirectional transceiver corresponding to the directional transmitter according to the difference between the receiving time and the transmitting time.

11. The method for location determination according to claim 10, wherein the step for receiving the response signal further comprises a step for determining whether the transmission identification of the response signal is equal to the transmission identification of the transmission signal.

12. The method for location determination according to claim 10, wherein the step for transmitting the transmission signal further comprises a step for saving a referring time when the directional transmitter passes by a referring direction.

13. The method for location determination according to claim 12, wherein the step for calculating the location further comprises a step for calculating an angle and a step for calculating a distance, the angle is calculated according to the angular velocity, the transmitting time and a referring time; the distance is calculated according to the difference between the receiving time and the transmitting time.

* * * * *